Sept. 12, 1944.                J. T. SNOREN                    2,358,036
                          LOCOMOTIVE PISTON VALVE
                           Filed Feb. 21, 1941           2 Sheets-Sheet 1

Inventor
JOHN T. SNOREN

By *Howard Giesle*

Attorney

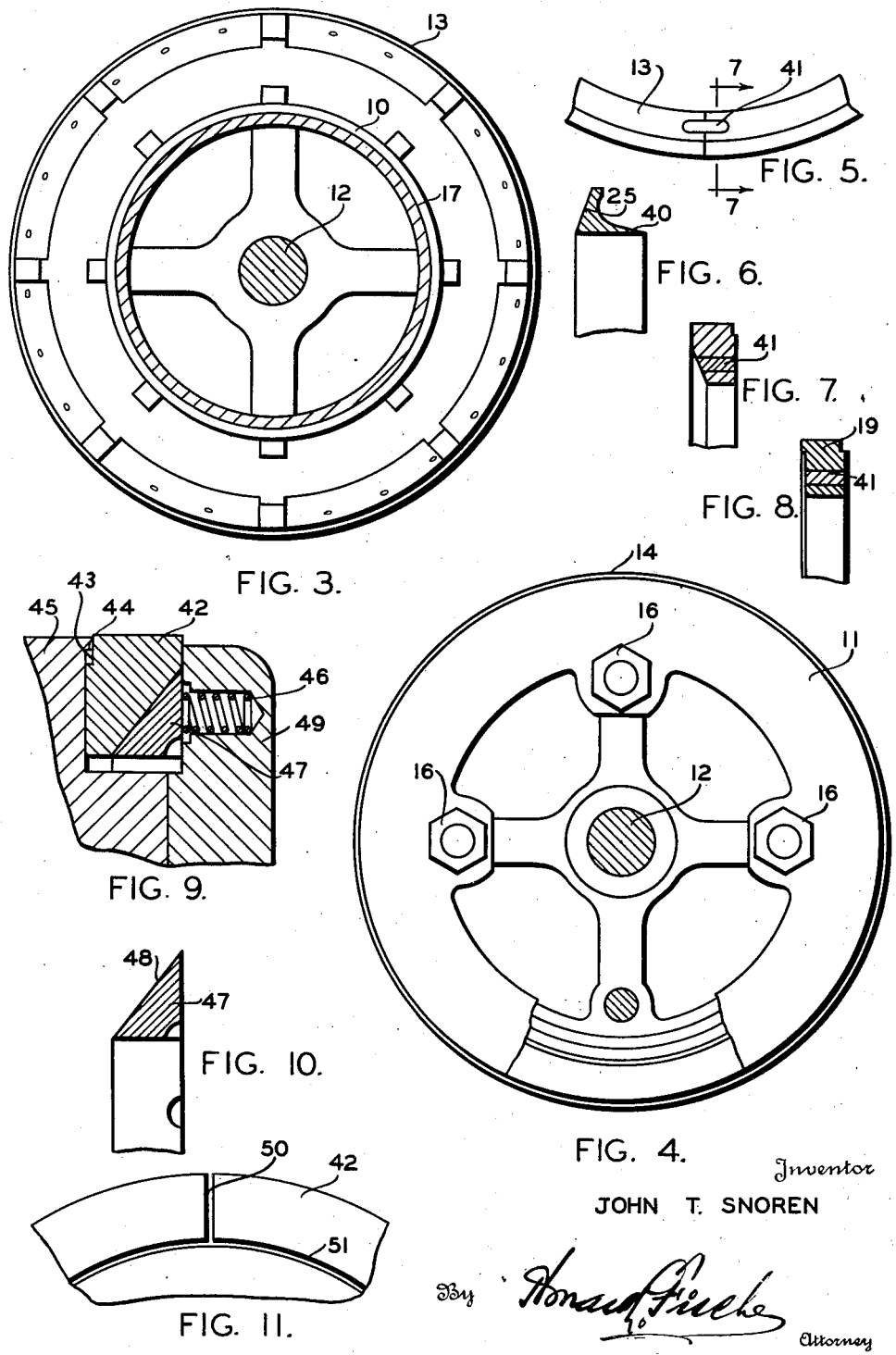

Patented Sept. 12, 1944

2,358,036

UNITED STATES PATENT OFFICE 2,358,036

LOCOMOTIVE PISTON VALVE

John T. Snoren, St. Paul, Minn.

Application February 21, 1941, Serial No. 380,079

2 Claims. (Cl. 309—26)

My invention relates to an improvement in locomotive piston valves. With the advent of modern streamlined locomotives operating at increasingly higher speeds than heretofore possible, the problem of efficiently controlling friction in the moving parts is of primary importance.

An object of my invention is to simplify the construction and at the same time improve the operation of locomotive piston valves. Modern locomotives operate with super-heated steam and pressures ranging in high temperatures. Thus the problem of properly lubricating the working surfaces where enormous frictional drag is set up is particularly difficult. In my form of construction, I have provided a lightweight piston valve. The valve construction is made lighter by having a hollow cylindrical tubular portion and by making the end members hollow. By providing a lightweight valve construction, the operation of the valve is improved, and the frictional drag between the rings and the valve bushings is greatly reduced. By cutting down the friction of the piston valves, the life of the valve is greatly increased and at the same time is operated with much greater efficiency.

Locomotive piston valves at the present time are provided with packing rings which form an enormous frictional drag against the walls of the valve bushings mainly by steam pressure getting under the rings, causing undue expansion of the rings. These old type valves are also heavy, which increases the wall drag. The modern locomotives operate under such high temperatures and such enormous pressures, that it is a problem to properly lubricate the working surfaces of the piston valve. Thus when the rings are expanded by the pressure back of the rings, there is greater friction between the rings and the valve bushings. Therefore if the friction is too great, the lubrication is reduced and the rings wear out faster, causing the piston valve to operate inefficiently.

Too much friction between the rings and the cylinder walls of the valve causes the cylinder walls to run dry. Thus by the cylinder walls running dry, the valve motion itself often breaks down or makes it necessary to make repairs.

It is a feature of my invention to provide a piston valve which will eliminate the undesirable features of the present type of valve. My lightweight valve will give free operation, practically eliminate lubrication troubles, and will overcome much of the friction now present in the old valves, thereby reducing the danger of some parts of the valve motion tearing itself apart in service.

It is the object of my invention to provide a sealing ring which will cut off the steam which comes in contact with the piston valve from getting beneath the rings, which usually causes undue expansion of the rings. When the steam or pressure is cut off from getting beneath the rings, the rings will operate more freely and without causing excess friction between the rings and the valve bushing walls.

The sealing ring also accomplishes the task of expanding the steam rings as the steam pressure against the sealing ring forces it laterally against the steam rings. The angular face of the continuous sealing ring acts against the similar angular face of the adjacent cut steam ring and the latter will be forced to expand moderately by the reciprocation of the valve.

It is another feature of my invention to provide an expansion control ring which moves horizontally by the action of steam when the piston valve is in motion. The expansion control ring is provided with springs which act against the control ring to keep it in proper working location when the locomotive piston valve is idle. The expansion control ring forces the exhaust ring on the locomotive piston valve to eliminate the expansive force of steam expanding itself under the ring against the walls of the valve. In the case of the exhaust ring, the force of the control ring against the exhaust ring cuts down or reduces the inside area of the exhaust ring. This is done by introducing a triangular ring. This ring is made in one piece and therefore cannot expand. By keeping the two rings, the exhaust ring and control ring, in contact, the force of the exhaust ring against the bushing surface will greatly reduce the friction.

Thus as has been stated before, the action of the sealing rings is mainly to shut off steam from getting beneath the steam rings and causing the steam rings to overexpand, causing undue friction between the steam rings and the cylinder wall in the valve. When the friction of the rings against the valve bushings has been cut down by the use of my sealing rings, lubricating the moving parts can be accomplished very easily. Therefore, the life of my locomotive piston valve is greatly increased over old types, and the working efficiency of the piston valve is greatly increased.

These and other objects and novel features of my invention will be more clearly and fully set forth in the following specification and claims.

In the drawings forming a part of my specification:

Figure 3 is a sectional view indicated by the line 3—3 of Figure 2.

Figure 4 is an elevational end view of a locomotive piston valve.

Figure 5 is a view showing the lower portion of a steam ring where the ring is keyed.

Figure 6 is a cross-sectional view taken through the sealing ring.

Figure 7 is a cross-sectional view through a steam ring.

Figure 8 is a cross-sectional view showing a similar steam ring to that shown in Figure 7.

Figure 9 is a sectional view through the piston valve exhaust ring arrangement.

Figure 10 is a sectional view through an expansion control ring.

Figure 11 is a view showing the exhaust ring where it is cut.

Figure 2:
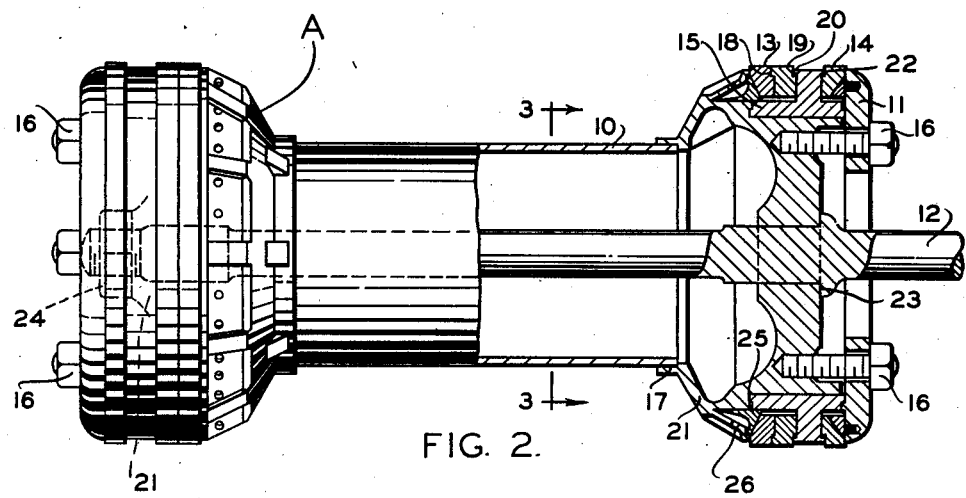
Figure 2 is an elevational view of a piston valve partly in cross-section.

My invention comprises a locomotive piston valve A which is best shown in Figure 2 of the drawings. The locomotive hollow spool-shaped piston valve A is composed of a hollow cylindrical section 10, follower plates 11, a stem 12, steam rings 13, an exhaust ring 14, bull rings 15, and tightening screws 16. The section 10 comes in contact in grooves 17 with the valve body 21. The steam rings 13 and 19 are grooved at 18, which causes the steam rings 13 and 19 to interlock with one another. The steam ring 19 is grooved at 20 and interlocks with the bull ring 15. The exhaust ring 14 is also grooved at 22 and is made to interlock also with the bull ring 15. Follower plates 11 are screwed in place by screws 16 to the body 21. Thus by tightening the screws 16, the follower plate causes the exhaust ring, the bull ring, and steam rings to tighten in place.

The stem 12 is flanged at 23 in a shoulder manner, and the shoulder rests against the body of the valve 21. At one end of the piston valve, I provide a nut 24. The nut 24 is screwed on the threaded end of the stem 12 and tightens against the body 21 of the piston valve.

Thus by tightening the nut 24 to the stem 12, the body of the piston valve is pulled against the section 10, making the unit compact.

I provide a sealing ring 25 which is placed next to the steam ring 13. The sealing ring 25 is made in one solid piece having no cut or joints. An open steam port 26 is provided around the body of the piston valve. When the steam enters the open steam port 26, it acts vertically and horizontally against the sealing ring 25. The sealing ring 25 then is forced downwardly and outwardly causing the steam rings 13 and 19 to press against each other, locking them more securely. With the use of the sealing ring 25, steam which enters the steam port 26 cannot work its way beneath the steam rings. Previously, when steam found its way beneath the steam rings of a locomotive piston valve, the pressure of the steam caused undue expansion of the steam rings, causing them to come in contact with the valve bushing walls, thus causing great friction. By the use of the sealing ring 25 as illustrated in Figure 2, the steam is completely shut off from entering underneath the steam rings. Thus the steam rings cannot overexpand, causing great friction between the rings and the valve bushing.

Figure 1:
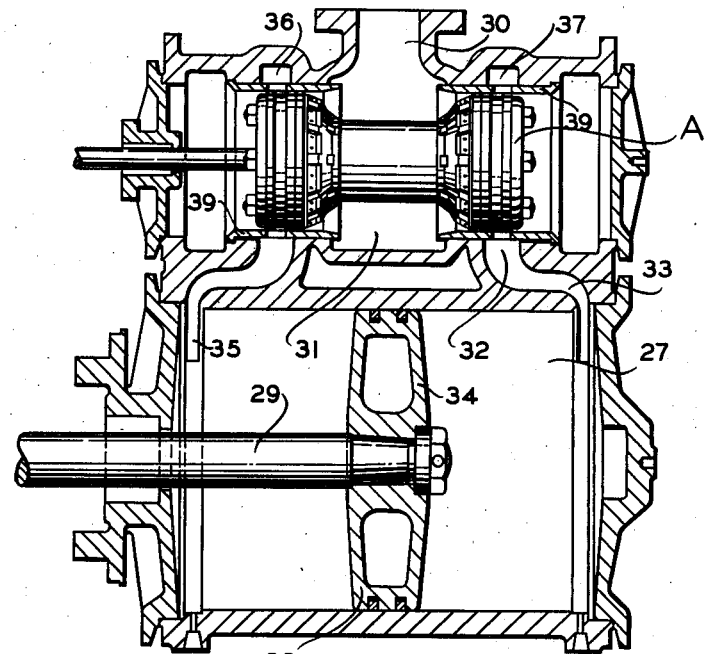
Figure 1 is a sectional view through a steam cylinder, showing the position of the piston valve.

In Figure 1 of the drawings, I show my locomotive piston valve as it would be when it is in operation. The drawing in Figure 1 shows a cylinder 27 and a piston 28 connected to a piston rod 29 in operation. The locomotive piston valve A is located above the steam cylinder 27, and when the locomotive is in operation, the piston valve A opens and closes steam ports which allow the steam to enter and escape from the steam cylinder 27 where the piston and piston rod are operated. The steam enters the steam port 30 and goes into a chamber 31. When the piston valve is to the extreme right, the steam enters the steam port 32. The steam then follows the steam passage 33 into the cylinder 27. The steam acts against the face of the piston 34, causing the piston and piston rod to move outwardly, forcing the steam which is in the other side of the chamber to go out the steam passage 35, up out through an exhaust 36. When the locomotive piston valve is to the extreme left, the steam enters the steam passage 35 which leads into the cylinder 27, causing the piston 34 to go in the opposite direction. As the piston 34 moves in the opposite direction, the steam which is between the piston and the cylinder wall is forced up out through the steam passage 33, out through an exhaust port 37. Thus as can be seen in the drawings, the locomotive piston valve operates the entry and exhaust steam ports.

The locomotive valve piston rings ride on valve bushings 39. Therefore it is very necessary that the valve bushings 39 are properly lubricated so that wear and friction between the valve rings and the valve bushings is as little as possible. As stated above, when steam finds its way underneath the piston valve rings, the rings are caused to overexpand, greatly increasing the friction between the rings and the valve bushing. Therefore it is an object of my invention to reduce the friction between the rings and the valve bushings 39. By using the sealing ring 25 to cut off the steam from entering beneath the steam rings of the piston valve, the rings cannot overexpand, and therefore friction is greatly reduced.

In the cases where there is great friction between the rings and the valve wall, it is difficult to lubricate the valve walls in the proper way inasmuch as the rings scrape the valve wall of the bushings dry. When the valve wall of the bushings becomes dry, friction is increased, which often leads to the break-down of the piston valve, and in some instances puts the piston valve out of operation altogether.

As shown in Figure 6 of the drawings, the sealing ring 25 is shown having a thin skirt 40 upon which the steam force acts vertically tending to close the sealing ring up tight against the body 21 of the locomotive piston valve. In Figure 7 of the drawings, the steam ring 13 is shown in cross-section through the sealing key 41 indicated by the line 7—7 of Figure 5. The steam rings 13 and 19 are sealed by the use of sealing keys which help to prevent the steam from getting under the steam rings. The steam ring 19 is very similar to the steam ring 13 as shown in Figure 8 of the drawings.

Figure 9 of the drawings shows a modified form of my invention wherein a triangular expansion control ring acts similarly to that of the sealing ring 25. An exhaust ring 42 is grooved at 43 and when the exhaust ring 42 expands, it is interlocked at 44 with a bull ring 45. Springs 46 are provided at even intervals against the expansion control ring. The springs 46 tend to hold the expansion control ring 47 in proper position when the locomotive piston valve is idle. A follower plate 49 holds the springs 46 in place against the sealing ring 47. The expansion control ring 47 is not cut, and is made of one piece. The expansion control ring as stated above is triangular as shown in cross-section in Figure 10 of the drawings. A side 48 lies against the exhaust ring 42. The exhaust ring 42 is provided with a thin cut 50 through which steam enters and fills up the space 51 underneath the ring.

The steam causes the exhaust ring to expand and also passes through vents (cut in the corners) of one-piece control ring 47, causing it to press horizontally against the exhaust ring, which action will greatly modify the outward force of the exhaust ring. The control ring, being made in one piece, does not move outwardly, but rather moves horizontally. It will also be apparent that my construction will prevent rings from wearing in the ring grooves and practically overcome slamming of the rings, because the control ring presses horizontally against the exhaust ring.

In the method just described, the expansion of the exhaust ring can be controlled, so that in this way the friction between the exhaust ring and the valve bushings is greatly reduced.

In accordance with the patent statutes, I have described the principles of construction and operation of my locomotive piston valve; and while I have endeavored to set forth the best embodiments thereof, I desire to have it understood that this is only illustrative of a means of carrying out my invention, and that obvious changes can be made within the scope of the following claims without departing from the spirit of my invention.

I claim:

1. In combination with a piston having about it an annular groove with a cylindrical floor, a sealing ring having a base engaging said cylindrical floor and formed with an outer wall curved in cross-section and an annular inner side wall in slanting relation outwardly to the other wall of the groove, a steam ring floatingly mounted in said groove having a correspondingly slanting side wall trending in the opposite direction and engaging the sloping side wall of the groove, said sloping walls holding the inner steam ring wall spaced from the floor of the groove, and means for admitting pressure steam against the transversely curved surface of the outside wall of the sealing ring, whereby the pressure will hold said ring upon the floor of the groove and cause contact of the sloping wall of the sealing ring and the sloping wall of the steam ring to tend to hold the steam ring in an outwardly operative position and to seal it against steam pressure.

2. In combination with a piston having about it an annular groove with a cylindrical floor, a sealing ring having a base engaging said cylindrical floor and formed with an outer wall curved in cross-section and an annular inner side wall in slanting relation outwardly to the other wall of the groove, a steam ring floatingly mounted in said groove having a correspondingly slanting side wall trending in the opposite direction and engaging the sloping side wall of the groove, said sloping walls holding the inner steam ring wall spaced from the floor of the groove, means for admitting pressure steam against the transversely curved surface of the outside wall of the sealing ring, whereby the pressure will hold said ring upon the floor of the groove and cause contact of the sloping wall of the sealing ring and the sloping wall of the steam ring to tend to hold the steam ring in an outwardly operative position and to seal it against steam pressure, and means for locking said steam ring in the groove.

JOHN T. SNOREN.